United States Patent
Ikeda et al.

(10) Patent No.: US 8,761,119 B2
(45) Date of Patent: Jun. 24, 2014

(54) HANDOVER METHOD, AND MOBILE TERMINAL AND HOME AGENT USED IN THE METHOD

(75) Inventors: Shinkichi Ikeda, Kanagawa (JP); Jun Hirano, Kanagawa (JP); Takashi Aramaki, Osaka (JP)

(73) Assignee: Panasonic Corporation, Osaka (JP)

( * ) Notice: Subject to any disclaimer, the term of this patent is extended or adjusted under 35 U.S.C. 154(b) by 339 days.

(21) Appl. No.: 13/126,682

(22) PCT Filed: Nov. 6, 2009

(86) PCT No.: PCT/JP2009/005914
§ 371 (c)(1),
(2), (4) Date: Apr. 28, 2011

(87) PCT Pub. No.: WO2010/052919
PCT Pub. Date: May 14, 2010

(65) Prior Publication Data
US 2011/0208877 A1 Aug. 25, 2011

(30) Foreign Application Priority Data
Nov. 7, 2008 (JP) .................................. 2008-286450

(51) Int. Cl.
*H04W 4/00* (2009.01)
(52) U.S. Cl.
USPC ........................................................ 370/331
(58) Field of Classification Search
USPC ......... 370/277, 328, 329, 331, 334, 351, 372, 370/373; 455/436–444; 709/238–244
See application file for complete search history.

(56) References Cited

U.S. PATENT DOCUMENTS

| 6,832,087 | B2 * | 12/2004 | Gwon et al. | 455/436 |
| 7,353,027 | B2 * | 4/2008 | Karagiannis et al. | 455/436 |
| 7,630,340 | B2 * | 12/2009 | Jung et al. | 370/331 |
| 7,801,078 | B2 * | 9/2010 | Kim et al. | 370/331 |
| 7,961,685 | B2 * | 6/2011 | Suh et al. | 370/331 |
| 7,969,945 | B2 * | 6/2011 | Navali et al. | 370/331 |
| 8,165,091 | B2 * | 4/2012 | Nix | 370/331 |
| 8,175,056 | B2 * | 5/2012 | Suh et al. | 370/331 |

(Continued)

FOREIGN PATENT DOCUMENTS

JP 2005-73271 3/2005

OTHER PUBLICATIONS

U. Narayanan, et al., "Signaling Cost Analysis of Handoffs in a Mixed IPv4tIPv6 Mobile Environment," IEEE Global Telecommunications Conference GLOBECOM, 2007, pp. 1792-1796.*
International Search Report dated Nov. 26, 2009.

(Continued)

*Primary Examiner* — Hassan Kizou
*Assistant Examiner* — Phyllis Book
(74) *Attorney, Agent, or Firm* — Dickinson Wright PLLC

(57) ABSTRACT

A technology is disclosed that provides a handover method and the like capable of improving communication efficiency by reducing tunnel overhead between a mobile node and a home agent. The technology includes: a step of transmitting, by a mobile node (UE) 107, a message including a home address allocation request in a network 102 of the handover destination and an allocated first address, to a home agent (HA) via an access router 104 before a handover; and a step of performing, by the HA, a predetermined process based on the received message and transmitting to the UE, a response message including a home address in response to the allocation request.

20 Claims, 8 Drawing Sheets

(56) References Cited

U.S. PATENT DOCUMENTS

| | | | |
|---|---|---|---|
| 8,184,589 B2* | 5/2012 | Lee et al. | 370/331 |
| 8,345,625 B2* | 1/2013 | Park | 370/331 |
| 8,391,235 B2* | 3/2013 | Park | 370/331 |
| 2003/0018810 A1* | 1/2003 | Karagiannis et al. | 709/238 |
| 2005/0286469 A1* | 12/2005 | Yang et al. | 370/331 |
| 2007/0014262 A1* | 1/2007 | Gras et al. | 370/331 |
| 2007/0189218 A1* | 8/2007 | Oba et al. | 370/331 |
| 2008/0259873 A1* | 10/2008 | Ahmavaara et al. | 370/331 |

OTHER PUBLICATIONS

U. Narayanan, et al., "Signaling Cost Analysis of Handoffs in a Mixed IPv4/IPv6 Mobile Environment," IEEE Global Telecommunications Conference GLOBECOM, 2007, pp. 1792-1796.

H. Soliman, "Mobile IPv6 Support for Dual Stack Hosts and Routers," IETF Internet Draft, draft-ietf-mext-nemo-v4traversal-06.txt, Nov. 3, 2008, pp. 1-50.

C. Perkins, "IP Mobility Support for IPv4," IETF RFC 3344, Aug. 2002, pp. 1-99.

D. Johnson, et al., "Mobility Support in IPv6", IETF RFC 3775, Jun. 2004, pp. 1-165.

H. Soliman, "Mobile IPv6 Support for Dual Stack Hosts and Routers," IETF Internet Draft, draft-ietf-mext-nemo-v4traversal-05.txt, Jul. 14, 2008, pp. 1-48.

3GPP TS 23.402 V8.2.0, "3rd Generation Partnership Project; Technical Specification Group Services and System Aspects; Architecture enhancements for non-3GPP accesses (Release 8)," Jun. 2008, pp. 136-139.

* cited by examiner

HANDOVER METHOD, AND MOBILE TERMINAL AND HOME AGENT USED IN THE METHOD

TECHNICAL FIELD

The present invention relates to a handover method in a communication system in which communication is performed while moving between networks supporting different IP versions, and a mobile terminal and a home agent (location management server) used in the method.

BACKGROUND ART

As mobility management protocol for a mobile node performing internet protocol communication (IP communication) in conventional mobile communication systems, Mobile IPv4 (MIPv4) or Mobile IPv6 (MIPv6) has been used. Details of these technologies are disclosed in Non-patent Document 1 and Non-patent Document 2, below. In addition, conventionally, Dual Stack Mobile IP (DSMIP) has been used that expands MIPv6 operating only in access networks supporting IPv6 to also operate in access networks supporting only IPv4. Details of this technology are disclosed in Non-patent Document 3.

A mobile node registers an IPv6 home address (HoAv6) and an IPv6 care-of address (CoAv6) in a home agent (location management server) using MIPv6 protocol based on Non-patent Document 2, and the home agent manages correlation (binding) of the addresses. However, all messages are based on IPv6 protocol and can only be used in accesses networks supporting IPv6. DSMIP is an expansion of MIPv6 and, when the mobile node attaches to an access network supporting only IPv4, enables communication using the HoAv6 even from the access network supporting only IPv4 by binding an IPv4 care-of address (CoAv4) acquired from the access network with the HoAv6.

Furthermore, under a premise that the home agent has an IPv4 address, the DSMIP enables exchange of binding control messages (such as binding update (BU) and binding acknowledge (BA) messages) based on MIPv6 by encapsulating the CoAv4 and the IPv4 address of the home agent by an IPv4 header contained in an address field, and enables communication with a correspondent node (CN) having only an IPv4 address by allocating an IPv4 home address (HoAv4) to the mobile node.

A method of enabling MIPv6-based binding management of a mobile node attached to an access network supporting only IPv4 is also disclosed in Patent Document 1, below. A handover method using similar technology is being examined for use in mobile communication systems for mobile phones, as well. In Non-patent Document 4, below, a method of performing a handover from a 3GPP access network (such as LTE) to a non-3GPP access network (such as a wireless LAN network system, a WiMAX network system, or a 3GPP2 network system) using DSMIP is disclosed.

PRIOR ART DOCUMENT

Patent Document

Patent Document 1: Japanese Patent Application Publication No. 2005-73271 (Abstract)

Non-Patent Document

Non-patent Document 1: C. Perkins, "IP Mobility Support for IPv4", IETF RFC3344, August 2002

Non-patent Document 2: D. Johnson, C. Perkins, and J. Arkko, "Mobility Support in IPv6", IETF RFC3775, June 2004

Non-patent Document 3: Hesham Soliman, "Mobile IPv6 Support for Dual Stack Hosts and Routers (DSMIP)", draft-ietf-mext-nemo-v4traversal-05.txt, July 2008

Non-patent Document 4: "Architecture enhancements for non-3GPP accesses (Release 8)", 3GPP TS 23.402 V.8.2.0, p. 136 to 139, June 2008

In the above-described prior art, the mobile node only performs home link detection regarding an IPv6 home prefix to which the home address HoAv6 belongs. In other words, the mobile node does not perform home link detection using the IPv4 address. Even when the subnet of the IPv4 address (equivalent to the CoAv4) acquired from the access network and the subnet of the HoAv4 are the same, the mobile node does not consider the access network to be a home link so long as the IPv6 prefix acquired from the access network and the IPv6 home prefix are not the same.

Therefore, even when the access network can actually be a home link from the perspective of the IPv4 subnet, an IPv4 tunnel header is required to be additionally added to all packets (binding control messages and user data) when the mobile node is using the HoAv4. As a result, header overhead increases, and a problem occurs in that communication efficiency decreases in a wireless communication system in which a plurality of mobile nodes share a particularly limited communication bandwidth.

Here, a challenge faced by conventional mobile communication systems will be described in detail with reference to FIG. 1 and FIG. 8. FIG. 1 is a configuration diagram of an example of a mobile communication system using DSMIP in which an access network 101 supporting IPv6, an access network 102 supporting only IPv4, and a core network 103 to which connection can be made via the access networks are arranged. Access routers AR 104 and AR 105 are respectively deployed in the access networks. Each access router is an IPv6 router or an IPv4 router depending on operation of the access network system.

A home agent HA 106 based on DSMIP is deployed in the core network 103. A mobile node UE 107 connects to the HA 106 via the access network 101 and acquires the IPv6 home address (HoAv6). Subsequently, the mobile node UE 107 moves to the access network 102 and performs a handover process.

FIG. 8 is a sequence chart for explaining an example of a conventional handover process procedure. The mobile node UE 107 detects the start of the handover process to the access network 102 (Step S801) and starts an attach process (Step S802). The attach process includes an attachment authentication process by an authentication server HSS/AAA 801 (Step S803) and is completed when the attachment is approved. Then, during or after completion of the attach process, the UE 107 acquires the IPv4 address using DHCP protocol or the like (IPv4 address allocation request and IPv4 address allocation: Step S804) and transmits a binding request message (binding update: BU) to register in the HA, the acquired IPv4 address as a care-of address (CoAv4) with the HoAv6 that has already been acquired (Step S805).

At this time, the UE 107 performs an IPv4 home address (HoAv4) allocation request based on DSMIP protocol using the BU. When the HA 106 receives the BU including the HoAv4 allocation request, the HA 106 registers the HoAv6 and CoAv4 pair in the binding cache, and provides notification to the UE 107 using a binding response message (binding acknowledge: BA) to allocate the HoAv4 (Step S806). In addition, the HA 106 registers the HoAv4 and CoAv4 pair in the binding cache.

Here, through comparison of the subnet sections of the acquired HoAv4 and CoAv4, the UE 107 is able to perform home link detection from the perspective of the IPv4 subnet (Step S807) that has not been performed in the past. As a result, when the subnet sections of the HoAv4 and the CoAv4 match, the UE 107 can deem the access network 102 to be a home link from the IPv4 perspective, and a redundant IPv4 tunnel header is no longer required to be attached to the packets exchanged with the HA 106.

If the subnet sections do not match, the access network 102 is not a home link. Therefore, the IPv4 tunnel header is required to be attached to all packets exchanged with the HA 106. Conventionally, the IPv4 tunnel header has been attached to all packets exchanged with the HA 106 because home link detection from the IPv4 perspective is not performed.

Here, reducing header overhead by not attaching the IPv4 tunnel header in any instance is ideal. In many wireless communication systems, the link between the mobile node and the AR is configured by a point-to-point link. Therefore, even when a single AR accepts a plurality of mobile nodes, an IPv4 address belonging to a different subnet can be provided to each mobile node.

In addition, the mobile node may perform a key update process, such as that shown in FIG. 8, with the HA, from the acquisition of the CoAv4 until the transmission of the BU. For example, a mobile node that does not support dynamic key update is required to perform a key update every time the care-of address is changed. Key update requires a time-consuming process involving code calculations in both the mobile node and the HA. Therefore, a considerable amount of time is required until the mobile node completes the home link detection from the IPv4 perspective and is able to actually transmit and receive packets.

SUMMARY OF THE INVENTION

In light of the above-described issues, in a mobile communication system using DSMIP, during a handover process by a mobile node having only an IPv6 home address, when an address allocated from a handover target access network is only an IPv4 address, the present invention detects that the handover target access network is an access network that only supports IPv4 and configures the allocated IPv4 address as an IPv4 home address in a home agent via the handover target access network. As a result, an object of the present invention is to provide a handover method, and a mobile node and a home agent used in the handover method, in which the handover target access network is a home link, and communication efficiency is improved by reducing tunnel overhead between the mobile node and the home agent. In addition, even in a case in which the mobile node performs a key update process, a binding process can be completed before the key update process, and packets can be transmitted and received without waiting for the time-consuming key update process to be completed.

To achieve the above-described object, the present invention provides a handover method for a mobile node that moves between at least two networks each supporting a different, unique IP version that is a communication protocol of the mobile node in which, when the mobile node performs a handover from an access router before the handover to which the mobile node is currently connected, to an access router of another network of a handover destination, when a judgment is made that the IP version supported by the network of the handover destination and the IP version supported by the network before the handover differ based on a first address allocated from the network of the handover destination to the mobile node, the handover method includes the steps of: transmitting, by the mobile node, a message including a home address allocation request in the network of the handover destination and the allocated first address, to a home agent via the access router before the handover; and performing, by the home agent, a predetermined process based on the message, and transmitting a response message including a home address in response to the allocation request to the mobile node. As a result of the configuration, the handover destination access network is the home link, and communication efficiency can be improved by reducing tunnel overhead between the mobile node and the home agent. In addition, even when the mobile node performs a key update process, a binding process can be performed before the key update process, and packets can be transmitted and received without waiting for completion of the time-consuming key update process.

In addition, the present invention provides a mobile node that performs a handover between at least two networks each supporting a different, unique IP version that is a communication protocol of the mobile node in which, when the mobile node performs a handover from an access router before the handover to which the mobile node is currently connected to an access router of another network of a handover destination, the mobile node includes: a judging means for judging whether the IP version supported by the network of the handover destination and the IP version supported by the network before the handover differ based on a first address allocated to the mobile node by the network of the handover destination; a message generating means for generating a message including a home address allocation request in the network of the handover destination and the allocated first address, when judged that the IP versions differ; a transmitting means for transmitting the generated message to a home agent via the access router before the handover; and a receiving means for receiving a response message including a home address in response to the allocation request, transmitted from the home agent based on the message. As a result of the configuration, the handover destination access network is the home link, and communication efficiency can be improved by reducing tunnel overhead between the mobile node and the home agent. In addition, even when the mobile node performs a key update process, a binding process can be performed before the key update process, and packets can be transmitted and received without waiting for completion of the time-consuming key update process.

In addition, the present invention provides a home agent of a mobile node that performs a handover between at least two networks each supporting a different, unique IP version that is a communication protocol of the mobile node in which, when the mobile node performs a handover from an access router before the handover to which the mobile node is currently connected, to an access router of another network of a handover destination, when a judgment is made that the IP version supported by the network of the handover destination and the IP version supported by the network before the handover differ based on a first address allocated from the network of the handover destination to the mobile node, the home agent includes: a receiving means for receiving a message that is a message transmitted from the mobile node, and that includes a home address allocation request in the network of the handover destination and the allocated first address; a processing means for performing a predetermined process based on the received message; a message generating means for generating a response message including a home address in response to the allocation request; and a transmitting means for transmitting the generated response message to the mobile node. As a result of the configuration, the handover destination access network is the home link, and communication efficiency can be improved by reducing tunnel overhead between the mobile node and the home agent. In addition, even when the mobile node performs a key update process, a binding process can be performed before the key update process, and packets can be transmitted and received without waiting for completion of the time-consuming key update process.

The handover method, and the mobile node and the home agent used in the method configure the handover target access network as the home link, and improve communication efficiency by reducing tunnel overhead between the mobile node and the home agent. In addition, even when the mobile node performs a key update process, a binding process can be performed before the key update process, and packets can be transmitted and received without waiting for completion of the time-consuming key update process.

DESCRIPTION OF EMBODIMENTS

Figure 1:
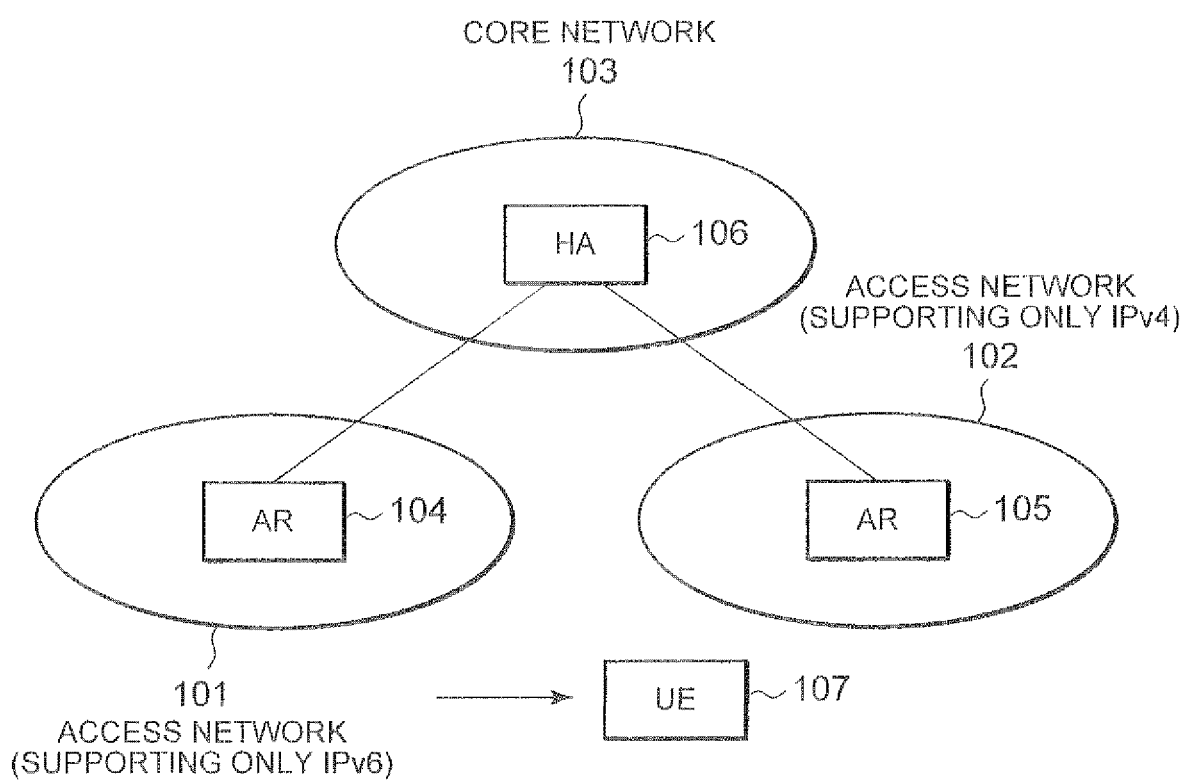
FIG. 1 is a configuration diagram of an example of a configuration of a communication system according to an embodiment of the present invention.

Details of an embodiment of the present invention will be described. FIG. 1 is a diagram for explaining a system configuration according to the embodiment of the present invention, in which in an access network 101 supporting IPv6, an access network 102 supporting only IPv4, and a core network 103 to which connection can be made via the access networks are arranged. Access routers AR 104 and AR 105 are respectively deployed in each access network. Each access router is an IPv6 router or an IPv4 router depending on operation of the access network system.

More specifically, depending on the standard used by the access network, the access router may be referred to as an access gateway (AGW), a mobility anchor gateway (MAG), a packet data gateway (PDG) or enhanced packet data gateway (ePDG), a serving gateway (SGW), a serving GPRS serving node (SGSN) or the like. The core network includes a home agent (HA) based on DSMIP. Depending on the standard used by the core network, the HA may be referred to as a packet data network gateway (PDN GW), a gateway GPRS serving node (GGSN), or the like.

In FIG. 1, a mobile node UE 107 connects to an HA 106 via the access network 101 and acquires an IPv6 home address (HoAv6). The mobile node UE 107 then moves to the access network 102 and performs a handover process.

Figure 2:
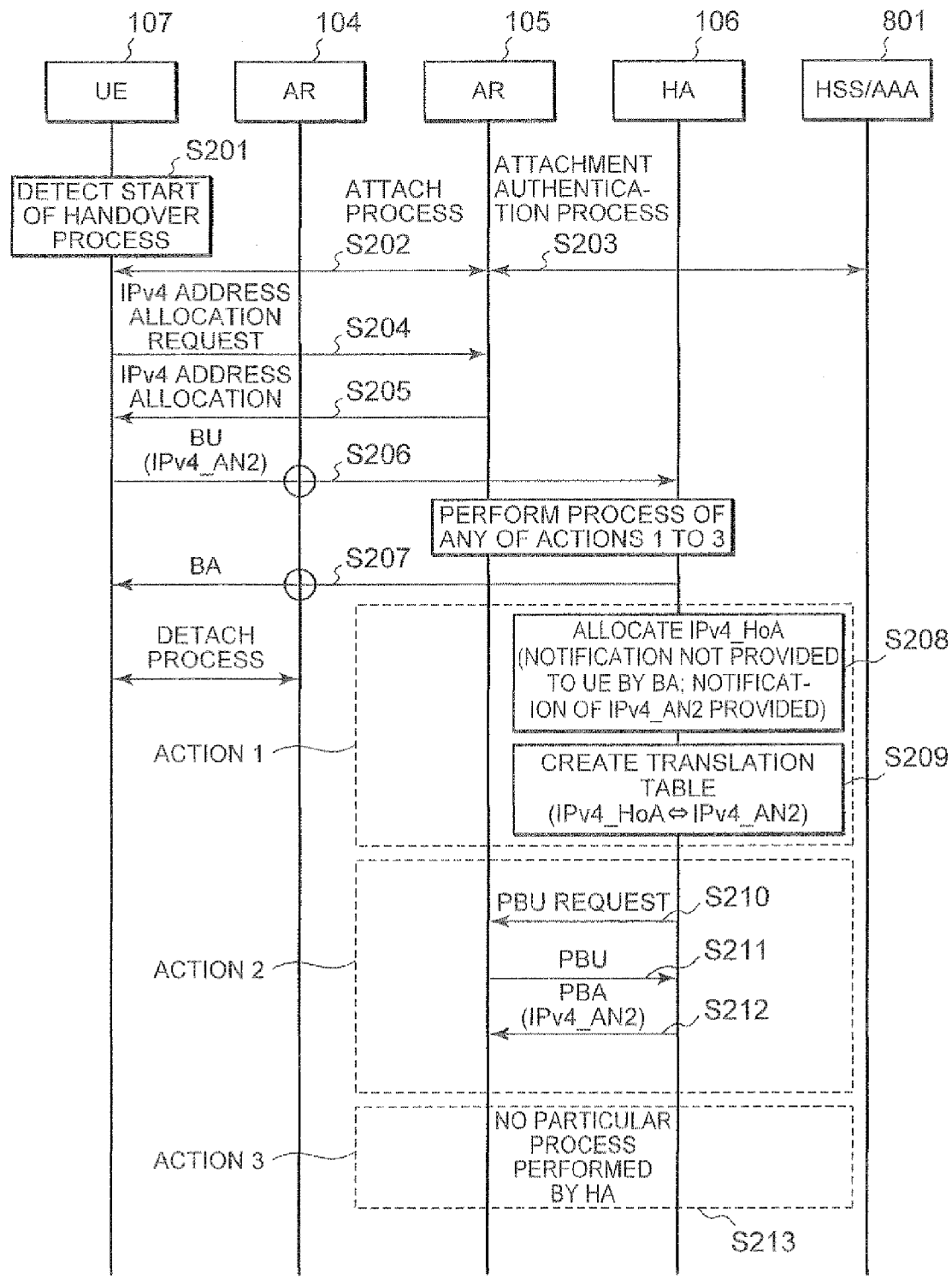
FIG. 2 is a sequence chart for explaining an example of a handover method according to the embodiment of the present invention.

FIG. 2 is a sequence chart for explaining an example of a handover method according to the embodiment of the present invention. When the UE 107 detects the start of the handover process to the access network 102 (Step S201), the UE 107 starts an attach process to the access network 102 (Step S202). The attach process is accompanied by an authentication process in the core network 103 (Step S203), and an IP address is allocated to the UE 107 within a response message when the authentication process is successfully completed. Alternatively, the IP address is not allocated within the response message, and the UE 107 acquires the IP address using a protocol such as DHCP after the completion of the attach process (Steps S204 and S205).

When DHCP protocol is used, there are several cases, where the IP address to be allocated is provided by a DHCP server within the access network 102, or when the AR 105 serves as a DHCP relay and forwards a DHCP request to the HA 106, upon reception of which the HA 106 provides the IP address in a DHCP response message. When PMIP protocol is applied, the AR 105 provides the IP address already acquired from the HA 106 by a PBA message to the UE 107 by a DHCP response, or the AR 105, having received a DHCP request, transmits a PBU message to the HA 106. Generally, a CoAv4 is allocated when the IP address is allocated by the DHCP server in the access network 102, otherwise a HoAv4 is allocated. Here, the IP address allocated in the access network 102 is referred as IPv4_AN2.

Because address type of the IPv4_AN2 that is the allocated IP address is not IPv6 but IPv4, the UE 107 confirms that the access network 102 is a network supporting only IPv4. Here, the UE 107 may perform a process such as the following to make it sure that the IP version supported by the access network 102 is IPv4.

For example, a router solicitation (RS) message for IPv6 address allocation is transmitted during or immediately after acquisition of the IPv4_AN2, and a response is not received for a certain amount of time, so that the UE 107 makes it sure that supports only IPv4. Alternatively, a packet on the link is monitored during or immediately after acquisition of the IPv4_AN2 and an IPv6 packet cannot be detected, so that the UE 107 makes it sure that supports only IPv4.

When UE 107 makes it sure that the access network 102 is a network supporting only IPv4, the UE 107 transmits a BU to the HA 106 via the source access network 101 for the handover (Step S206). At this time, the BU includes the HoAv4 allocation request, and the IP address IPv4_AN2 acquired in the access network 102 is contained. Furthermore, a piece of information (such as a flag, referred to hereinafter as a flag X) may be included that provides an indication that the UE 107 is on handover process and the IPv4 address (IPv4_AN2) allocated in the target access network 102 for the handover is requested to be the HoAv4 which is being allocated by the HA 106.

Alternatively, instead of the flag X, the HA 106 may be notified of information regarding the access network 102 (for example, an identifier of the access network or an identifier of an access point, such as SSID, or a PLMN identifier) in the BU. The HA 106 may then detect the IP version supported by the access network 102 based on a database or the like and, when it is detected that the access network 102 supports, only IPv4, the same operation may be performed as if the flag X were added to the BU.

When the HA 106 receives the BU including the HoAv4 allocation request (and the above-described flag X) containing the IPv4_AN2, via the access network 101, the HA 106 performs any of the following processes (actions 1 to 3) and transmits a BA in which the IPv4_AN2 is contained as the allocated HoAv4 to the UE 107 (Step S207). Before the HA 106 performs any of the actions, the HA 106 may receive approval from the authentication server HSS/AAA 801 to the request to configure the IPv4_AN2 as the home address.

A process of the action 1 will be described. The HA 106 allocates an address (IPv4_HoA, herein) differing from the IPv4_AN2 as the actual HoAv4 of the UE 107 (Step S208) and creates a translation table in which the mapping between the IPv4_AN2 and the IPv4_HoA is described (Step S209). Subsequently, packets having the IPv4_AN2 as a transmission source address transmitted from the UE 107 are forwarded with the header in which the source address is modified to the IPv4_HoA. Packets addressed to the IPv4_HoA are forwarded with the headers in which the target address is modified to the IPv4_AN2. Here, as a result of the HA 106 performing matching with the IPv4_HoA actually allocated by the HA 106, additional action is required in the access network 102 (AR 105) that has already allocated the IPv4_AN2, and expandability of the network is ensured.

The method can be applied also a case where the UE 107 performs handover several times then IP address as IPv4_AN2 is changed accordingly. In other words, when the IP address acquired in the handover target access network is the home address to be used in actual communication, the home address changes with every handover, which is not preferable for the UE 107 that requires to continue the session. On the other hand, when the HA 106 allocates a dedicated home address (IPv4_HoA) to the UE 107, and the HA 106 performs a translation process with the IPv4_AN2 that is the IP address acquired by the UE 107 in the access network, even when the IPv4_AN2 is changed as a result of a handover, because communication is actually performed using the IPv4_HoA even when the IPv4_AN2 is changed as a result of a handover, session continuity can be achieved.

Furthermore, the UE 107 may be notified of the actual home address IPv4_HoA allocated by the HA 106 through a BA which contains the home address IPv4_HoA and is transmitted via the access network 101, and a similar translation table as that in the HA 106 may be managed in the UE 107. As a result, in subsequent communications, header overhead can be reduced by packet processing using the IPv4_HoA that is the actual home address being performed in an application process within the UE 107, packet processing using the IPv4_AN2 being performed in a transport process of the layer below application, and the connected access network serving as a pseudo home link. Meanwhile, session continuity can be achieved after handover between access networks.

At this time, although the UE 107 is notified of the IPv4_HoA and the IPv4_AN2 as the home addresses in the BA, a flag may be provided for clarifying which address is the actual home address (actually used in communication with the outside). Alternatively, when other home address than the address requested before as the home address in the BU is provided in the BA, the UE 107 may translate the acquired home address to be the actual home address, and the present invention can be performed without changing the existing message format. Furthermore, BA provides only the IPv4_HoA and a flag instead of providing the IPv4_AN2, which flag indicates packet processing using the translation table to be performed, such that the UE 107 can be notified using a flag having less number of bits than a home address notification option, thereby increasing transmission efficiency.

Next, a process of the action 2 will be described. To establish connection with the AR 105, the HA 106 transmits a proxy binding update (PBU) request message to the AR 105 requesting transmission of a PBU (Step S210). The PBU request message may be that providing an indication to the AR 105 by HA 106 via the authentication server (HSS/AAA 801) or the like. Upon reception, the AR 105 transmits the PBU to the HA 106 (Step S211), and the HA 106 returns, to the AR 105, a proxy binding acknowledge (PBA) message in which the IPv4_AN2 is provided (Step S212).

Here, although the UE 107 has already acquired the same address, in order to make sure, the AR 105 that has received the PBA may instruct the UE 107 to perform the DHCP request again by sending a DHCP refresh request or the like, with the IPv4_AN2 as the home address allocated by the HA 106. In other words, the UE 107 re-acquires the home address from the target network 102 for the handover. As a result, the mobile node 107 can detect that the target access network 102 for the handover has been officially configured as the home link, and the mobile node 107 can be correctly notified of the timing at which communication not requiring tunneling can be started.

As a result, the access network 102 can be authorized that the IPv4_AN2, although already allocated, is the home address allocated by the core network 103 (HA 106) via a PMIP tunnel connected between the AR 105 and the HA 106, and can subsequently perform mobility management for the UE 107 using a standard PMIP protocol. The DHCP server within the access network 102 that has provided the IPv4_AN2 before is required to be controlled such as to temporarily stop managing the IPv4_AN2. The DHCP server is again given control when the UE 107 stops use of the IPv4_AN2. As a result, the DHCP server in the access network 102 is controlled to avoid releasing or reallocating the IPv4_AN2 on its own accord, and unintentional disconnection of a session in progress can be prevented.

Next, a process of the action 3 will be described. When the IPv4_AN2 provided via the access network 102 is actually what was provided from the HA 106 (in other words, when the IPv4_AN2 is the home address), because a desired state is already achieved, the HA 106 needs to perform nothing (Step S213), and returns a BA in which the IPv4_AN2 is provided as the home address to the UE 107 (Step S207).

As a result, the UE 107 make it sure that the address allocated by the access network 102 and the home address provided via the access network 101 are the same IPv4_AN2, in other words, that the access network 102 is the home link. When the flag X or an equivalent information is included in the BU when the IPv4_AN2 provided before via the access network 101 is registered, detection by the UE 107 if the access network 102 is the home link (namely, home link detection) can be omitted.

The UE 107 that has confirmed that the access network 102 is the home link transmits a BU for registering a binding between the HoAv6 and the HoAv4 to the HA 106, in adherence to a conventional handover procedure, and receives a BA from the HA 106. Here, when the BU and the BA for HoAv4 allocation transmitted before via the access network 101 is exchanged with the HA 106, the HA 106 will generate the binding between the HoAv6 and the HoAv4.

As a result, the BU/BA exchange via the access network 102 can be omitted, and the handover time will be reduced. Furthermore, because the BU/BA at this time can be omitted, packet transmission and reception can be immediately performed. Compared particularly to when the UE 107 requires a key update process, the effect of the handover time reduction becomes significant. A reason for this is that the key update process is required to be performed before performing the BU/BA exchange (because its purpose is to update an IPsec key for protecting the BU/BA). The key update process can be performed at any time after completion of the handover process as a result of the BU/BA exchange being omitted.

The HA 106 may reject use of the IPv4_AN2 as the home link when: a subnet (prefix) range of the IPv4_AN2 that is the IP address requested as the home link by the UE 107 differs from that allocated to an operator managing the HA 106; the subnet range differs from a subnet range that can be acquired by the HA 106 from an external network (for example, an ISP or a packet domain network [PDN] such as a corporate network); contractual restrictions exist between an operator managing the core network 103 and an operator managing the access network; the IPv4_AN2 is an address within NAT and is problematic for use as a home address; or the like.

Figure 3:
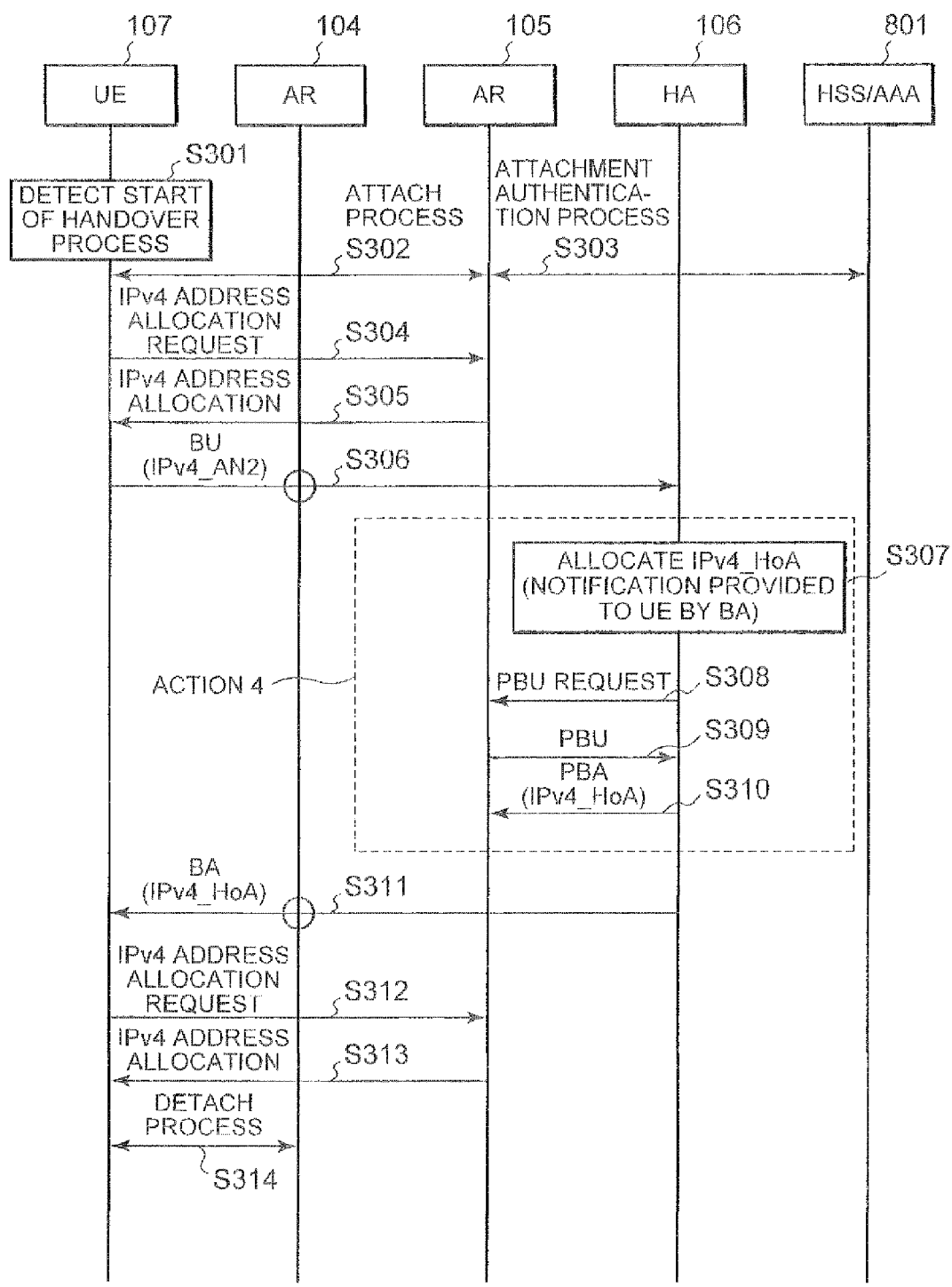
FIG. 3 is another sequence chart for explaining an example of the handover method according to the embodiment of the present invention.

In this case, the HA 106 performs, for example, the above-described process of the action 1 or, as shown in action 4 in FIG. 3, allocates a different home address (IPv4_HoA) to the UE 107 and notifies the UE 107 by a BA (notification of IPv4_AN2 is not provided). In the latter case, the UE 107 judges that the access network 102 is an external link (in other words, not a home link), and performs communication based on standard mobile IP using the home address which has been notified by the BA and the IPv4_AN2 that is the IP address allocated in the access network 102 (tunnel communication is performed between the UE 107 and the HA 106 in which the IPv4_AN2 and the IPv4 address of the HA 106 are the tunnel end points).

In the description above, when the HA 106 rejects configuring the address IPv4_AN2 allocated from the handover target access network 102 as the home address, the HA 106 notifies the UE 107 of a legitimate home address (IPv4_HoA) differing from the IPv4_AN2 using the BA (Step S311). Here, there is a possibility that the IPv4_HoA allocated by the HA 106 is able to be provided to the UE 107 via the access network 102. In other words, the HA 106 allocates the IPv4_HoA and, at the same time, transmits a PBU request message to the AR 105 (Step S308).

Upon reception, the AR 105 transmits a PBU to the HA 106 (Step 309). The HA 106 returns a PBA in which the IPv4_HoA is contained to the AR 105 (Step S310). The UE 107 performs the DHCP request again (Step S312). As a result, the legitimate home address (IPv4_HoA) can be allocated via the access network 102, and the UE 107 is no longer required to perform tunnel communication with the HA 106. The AR 105 that has received the PBA may prompt the UE 107 to perform the DHCP request again, using the DHCP refresh request or the like. In other words, the UE 107 re-acquires the home address from the target access network 102 for the handover. In addition, the UE 107 may release the IPv4_AN2 received before (DHCP release), and effective use of address resources can be achieved.

In the above-described action 2 or 4, the AR 105 may include the address (IPv4_AN2) provided to the UE 107 in the PBU transmitted to the HA 106. As a result, when the AR 105 allocates and provides a local address, the HA 106 verifies with the IPv4_AN2 acquired from the BU via the access network 101. In other words, the HA 106 can receive the address (first address) already allocated to the UE 107 by the AR 105 in the target access network 102 for the handover from the AR 105, and verify the address included in the message and the received address (first address), thereby enhancing the security of the system. In addition, in the action 1 as well, the HA 106 may issue a PBU request message to the AR 105 and receive a PBU including the IPv4_AN 2, thereby achieving a similar effect. Here, use of the PBU message based on PMIP is one specific example, and other messages may be used.

In addition, in a state in which the UE 107 is already disconnected from the access network 101 as a result of poor radio wave or the like, or cannot in effect communicate, the UE 107 may not be able to receive the BA transmitted by the HA 106. Under an assumption of such a situation, the HA 106 may notify the UE 107 that the IPv4_AN2 has been authorized as the home address via the access network 102 by transmitting a BA via the network 101 before the handover and the target access network 102 for the handover, or transmitting a BA to the access network 101 and initiating a bootstrapping process using IKEv2 based on DSMIP in the access network 102, or the like. As a result, even when the UE 107 cannot receive the process result from the HA 106 via the access network 101, the UE 107 can receive the process result (that the handover target access network 102 is able to be the home network) with certainty via the target access network 102 for the handover.

Furthermore, during the attach process or when acquiring an IP address from the access network 102 using the DHCP protocol, the UE 107 may provide notification of the intent to make the IP addresses to be acquired, the home address. Specifically, a flag is provided in an attach message or the DHCP request message transmitted by the UE 107. When the UE 107 provides the notification during the attach process, the authentication server HSS/AAA 801 translates the notification and indicates the HA 106 to perform home address allocation. The HA 106 allocates the home address, and forwards the home address to the UE 107 by an attach response message or indicates the UE 107 to acquire the home address by using DHCP.

When the UE 107 has provided the notification during the attach process but is required to acquire the IP address using DHCP after completion of the attach process, the AR 105 that has received the DHCP request from the UE 107 provides the home address provided from the HA 106 using PMIP protocol, GTP protocol, or the like during the attach process, to the UE 107 in a DHCP response, forwards the DHCP request to the HA 106 and requests allocation, or newly initiates PMIP protocol in the HA 106 (transmits a PBU message) and forwards the home address allocated by the HA 106 to the UE 107.

In only a case in which the access network is able to forward the request from the UE 107 during the attach process, as described above, notification of the intent to make the IP address to be acquired the home address or the desire to make the access network to which the UE 107 is currently attached the home link may be provided from the mobile node to the network as an option during selection (mobility mode selection) of one mobility protocol among various mobility protocols such as PMIP, DSMIP, and MIPv4 (RFC 3344). In addition, although this is not an issue when the load and the degree of congestion are low in a communication system or an access network having a large wireless communication capacity, when the load and the degree of congestion, and the number of accepted mobile nodes are high in a communication system and an access network having a small communication capacity, or when the remaining battery of the mobile node becomes low and power consumption should be reduced, a solution to the above-described problems can be achieved by the tunnel header process becoming unnecessary as a result of the access network of the attachment destination being the home link.

Figure 4:
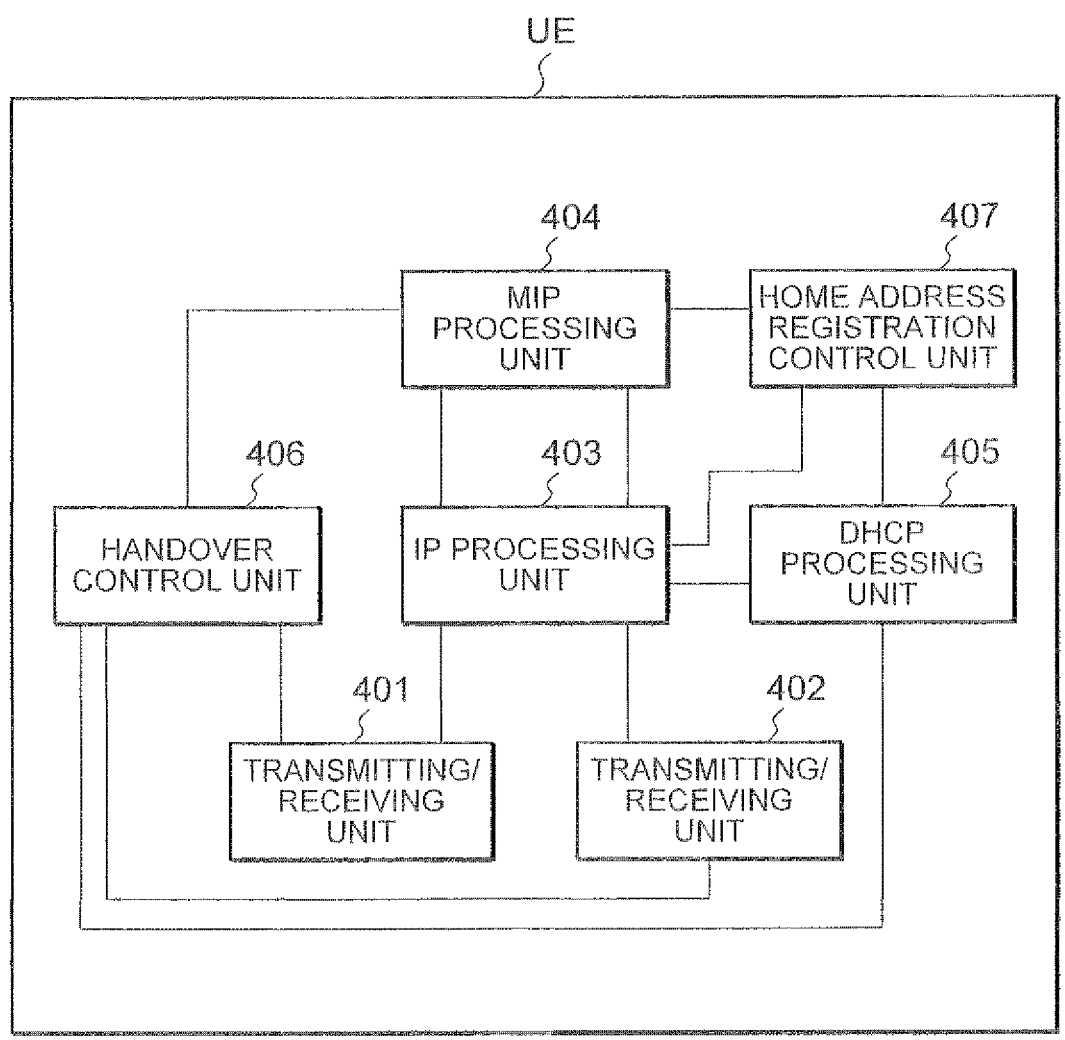
FIG. 4 is a configuration diagram of an example of a configuration of a mobile node according to the embodiment of the present invention.

Next, an example of the operations of the mobile node (UE) and the home agent (HA) according to the embodiment of the present invention will be described respectively with reference to FIG. 4 and FIG. 5. FIG. 4 is a diagram of an example of a configuration of the mobile node according to the embodiment of the present invention. Transmitting/receiving units 401 and 402 are equivalent to communication interfaces for respectively attaching to the access networks 101 and 102, and perform a communication protocol process and a modem process of layers below the IP layer. An IP processing unit 403 performs the IP layer process, and an MIP processing unit 404 performs a Mobile IP protocol process based on DSMIP.

Figure 6:
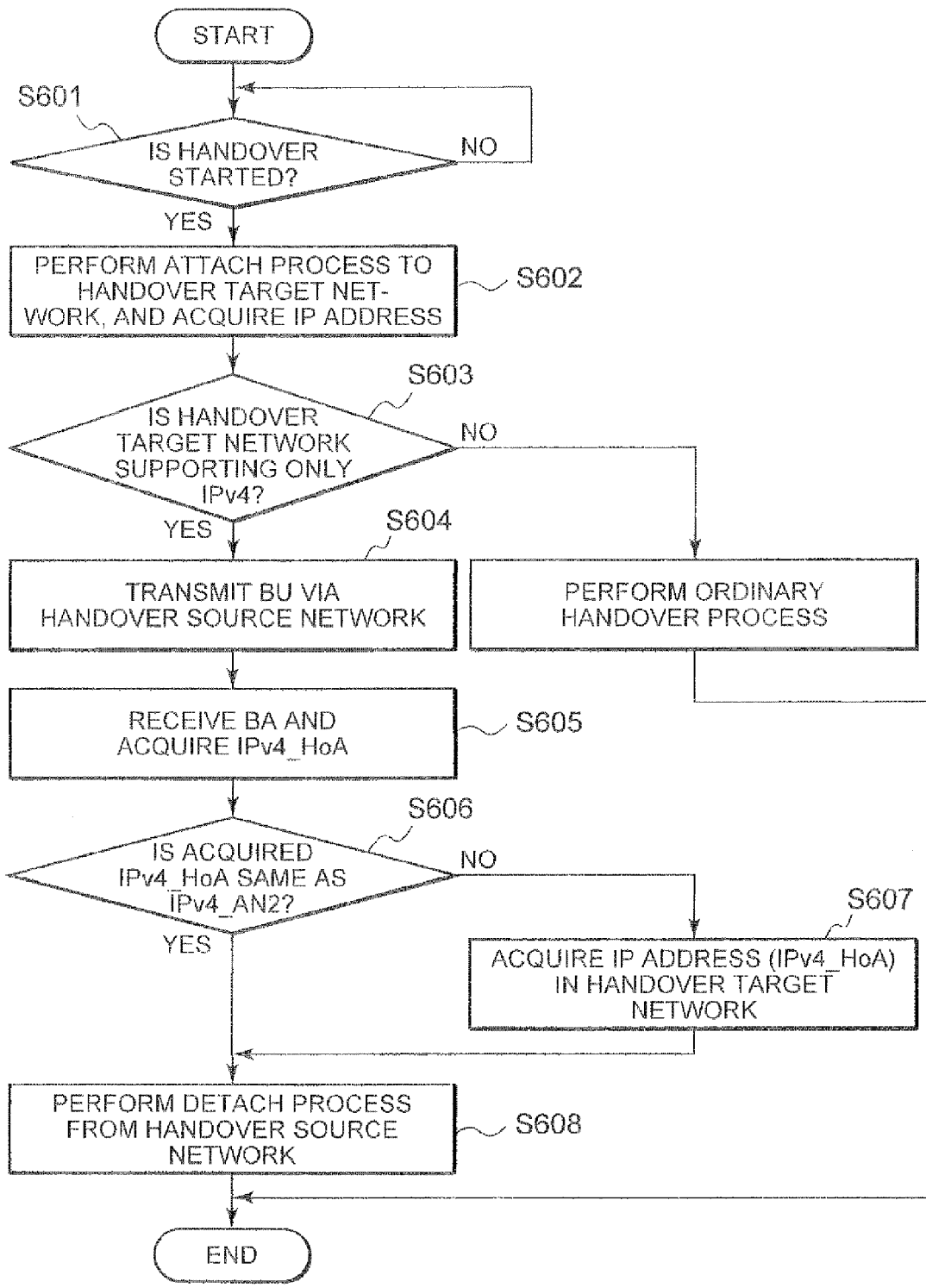
FIG. 6 is a flowchart of an example of a process flow in the mobile node according to the embodiment of the present invention.

A DHCP processing unit 405 performs a DHCP protocol process (client function). A handover control unit 406 controls the handover process by judging or detecting the possibility of a handover being performed and the timing of the handover based on communication status and the like acquired from the transmitting/receiving units 401 and 402, and sending an indication for a handover operation to the MIP processing unit 404, the transmitting/receiving units 401 and 402, the DHCP processing unit 405, and the like. A home address registration control unit 407 is characteristic of the present invention, and an operation thereof will be described with operations of its periphery, with reference to FIG. 6.

The handover control unit 406 judges whether a handover is started (Step S601). When the start of a handover is decided, the transmitting/receiving unit 402 is provided an indication to start the attach process. When an IP address (IPv4_AN2) is allocated from the access network 102 during the attach process, the transmitting/receiving unit 402 forwards the IPv4_AN2 to the IP processing unit 403 and the IPv4_AN2 is configured (Step S502: attach process and IP address allocation). When the IP address is not allocated during the attach process and the IP address is acquired using DHCP after completion of the attach process, the handover control unit 406 receives notification that the attach process has been completed from the transmitting/receiving unit 402 and indicates the DHCP processing unit 405 to start IP address allocation.

The DHCP processing unit 405 sends a DHCP request message to the access network 102 via the IP processing unit 403 and the transmitting/receiving unit 402, and acquires a DHCP response message including the IPv4_AN2 allocated in response via the transmitting/receiving unit 402 and the IP processing unit 403. The IPv4_AN2 acquired as a result is configured in the IP processing unit 403.

The home address registration control unit 407 judges whether the target access network 102 for the handover is an access network supporting only IPv4, from the version of the allocated IP address and the like (Step S603). When judged (detected) that the access network 102 is a network supporting only IPv4 (the detection method is as described above), the home address registration control unit 407 indicates the MIP processing unit 404 to transmit a BU notifying the HA 106 of the acquired IPv4 address via the source access network for the handover (access network 101). At this time, information (such as a flag) requesting that the IPv4 address of which notification is being provided be used as the home address may be added to the BU at the same time.

Here, at Step S603, to judge with certainty that the IP version (IPv4) supported by the target access network 102 for the handover and the IP version (IPv6) supported by the access network 101 before the handover differ, the home address registration control unit 407 detects that the access network is that supporting only IPv4 based on being unable to receive a response (router advertisement [RA] message) to a predetermined message (such as a router solicitation [RS] message) transmitted during acquisition of the allocated address, and/or being unable to detect (monitor) a predetermined packet (such as an IPv6 packet) during acquisition of the allocated address.

The MIP processing unit 404 transmits a BU (IPv4_AN2 is contained in the IPv4 home address option) requesting the IPv4 home address via the source network for the handover (Step S604). The BU is sent to the access network 101 via the IP processing unit 403 and the transmitting/receiving unit 401, and forwarded to the HA 106. In response, the MIP processing unit 404 receives a BA from the HA 106 (Step S605). The BA received from the HA 106 is forwarded to the MIP processing unit 404 via the transmitting/receiving unit 401 and the IP processing unit, and the MIP processing unit 404 judges whether the IPv4 home address (IPv4_HoA) contained in the BA is the same as the IPv4 address (IPv4_AN2) of which notification had been received before (Step S606). When the addresses are the same, the handover control unit 406 finally indicates the transmitting/receiving unit 401 to start a detach process from the access network 101 (Step S608), and the handover process is completed with the completion of the detach process. On the other hand, when the addresses are not the same, the IP address is acquired again using DHCP in the target access network 102 for the handover (Step S607). The detach process (Step S608) may be omitted or may be performed upon receiving an indication from the network.

As described above, conventionally, judgment regarding whether an access network is a home link is performed by comparison of the IPv4 address acquired during the attach process or in the DHCP process and the IP address acquired via the access network 101 is performed. However, here, the HA 106 is notified via the access network 101 of the IPv4 address acquired via the access network 102, and requested to configure the access network 102 as the home link of the UE 107. Whether the home address included in the BA is the same as the IPv4 acquired in the access network 102 is checked. In other words, a main characteristic of the present invention is that the home link judgment is unnecessary because the IP address provided in the access network 102 is the same as the home address.

Figure 5:
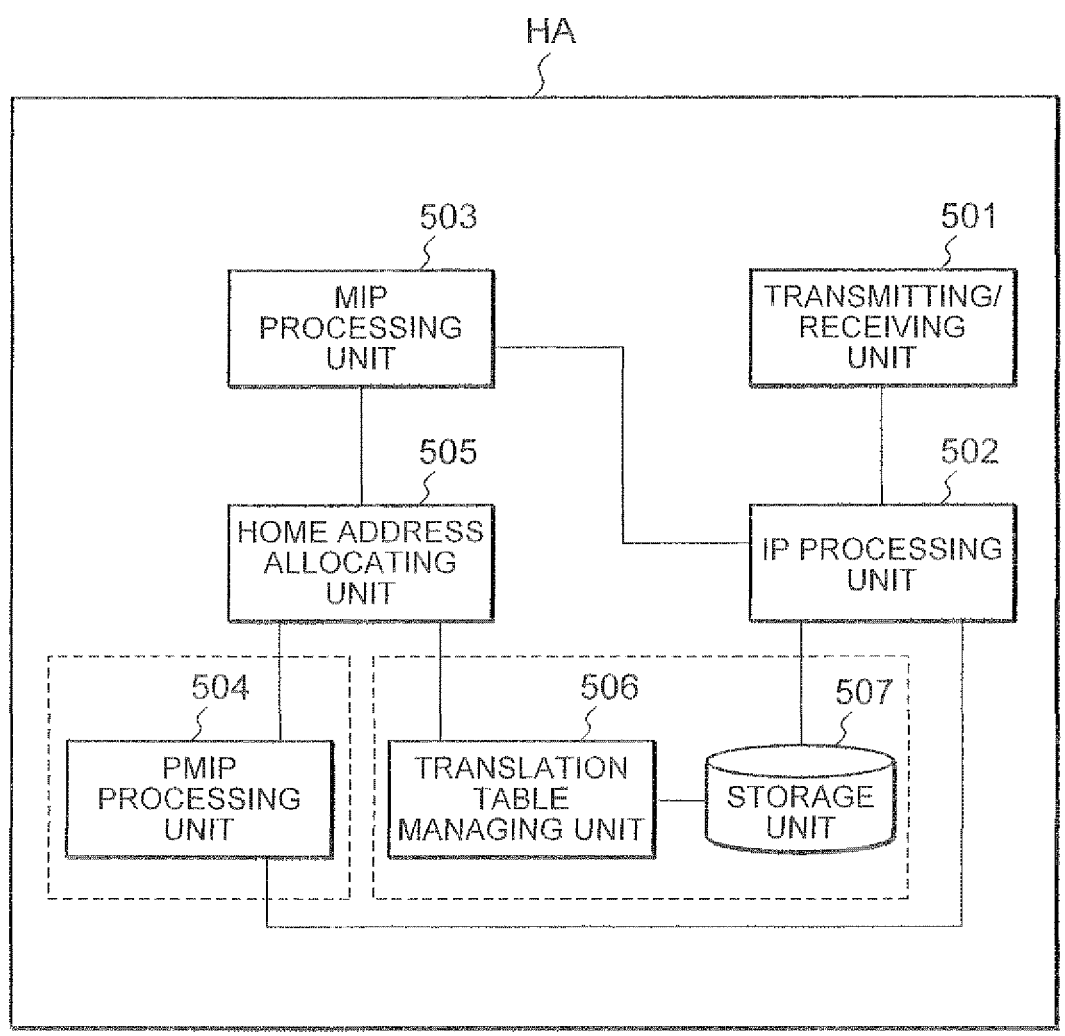
FIG. 5 is a configuration diagram of an example of a configuration of a home agent according to the embodiment of the present invention.
Figure 7:
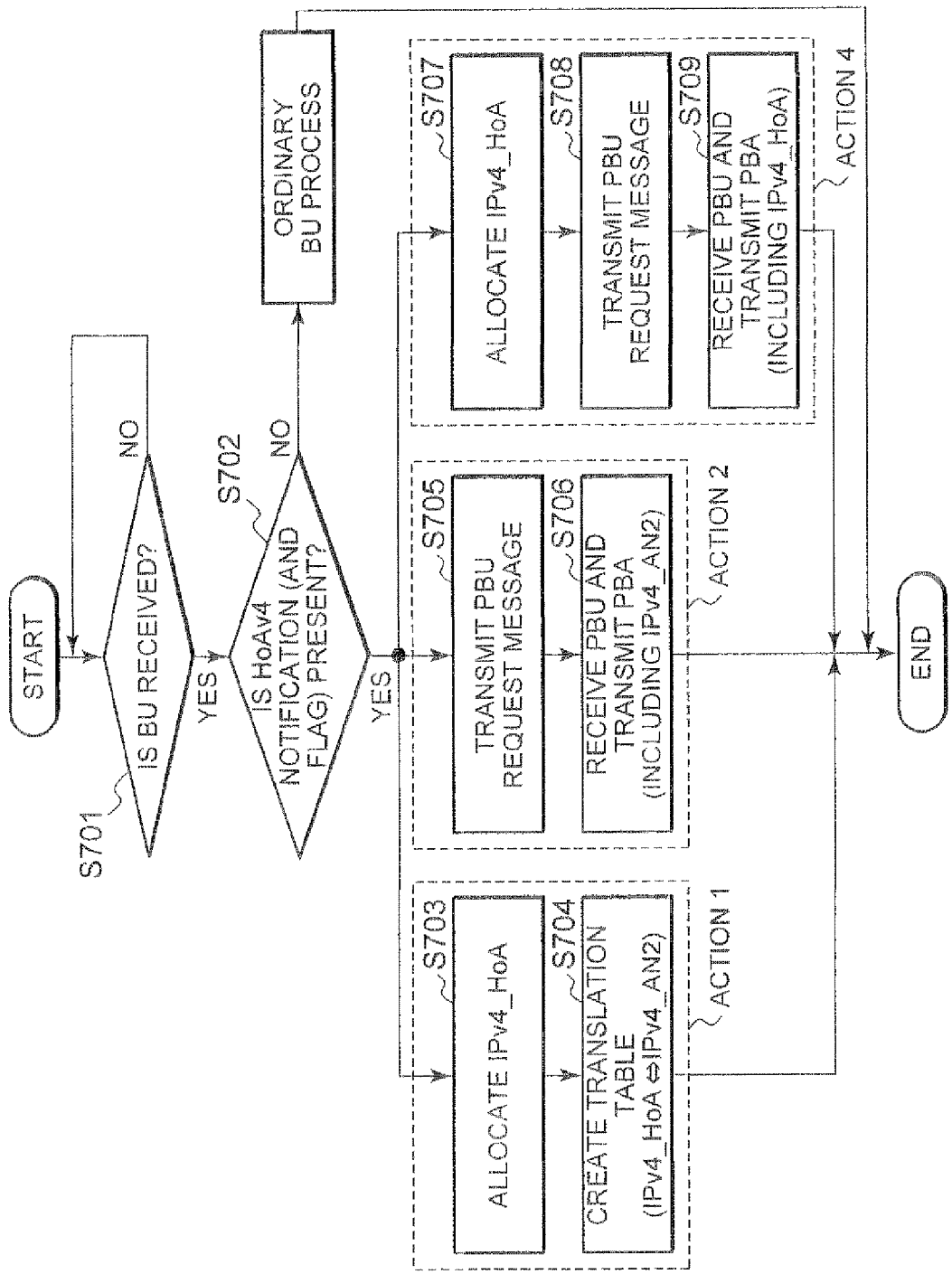
FIG. 7 is a flowchart of an example of a process flow in a home agent according to the embodiment of the present invention.
Figure 8:
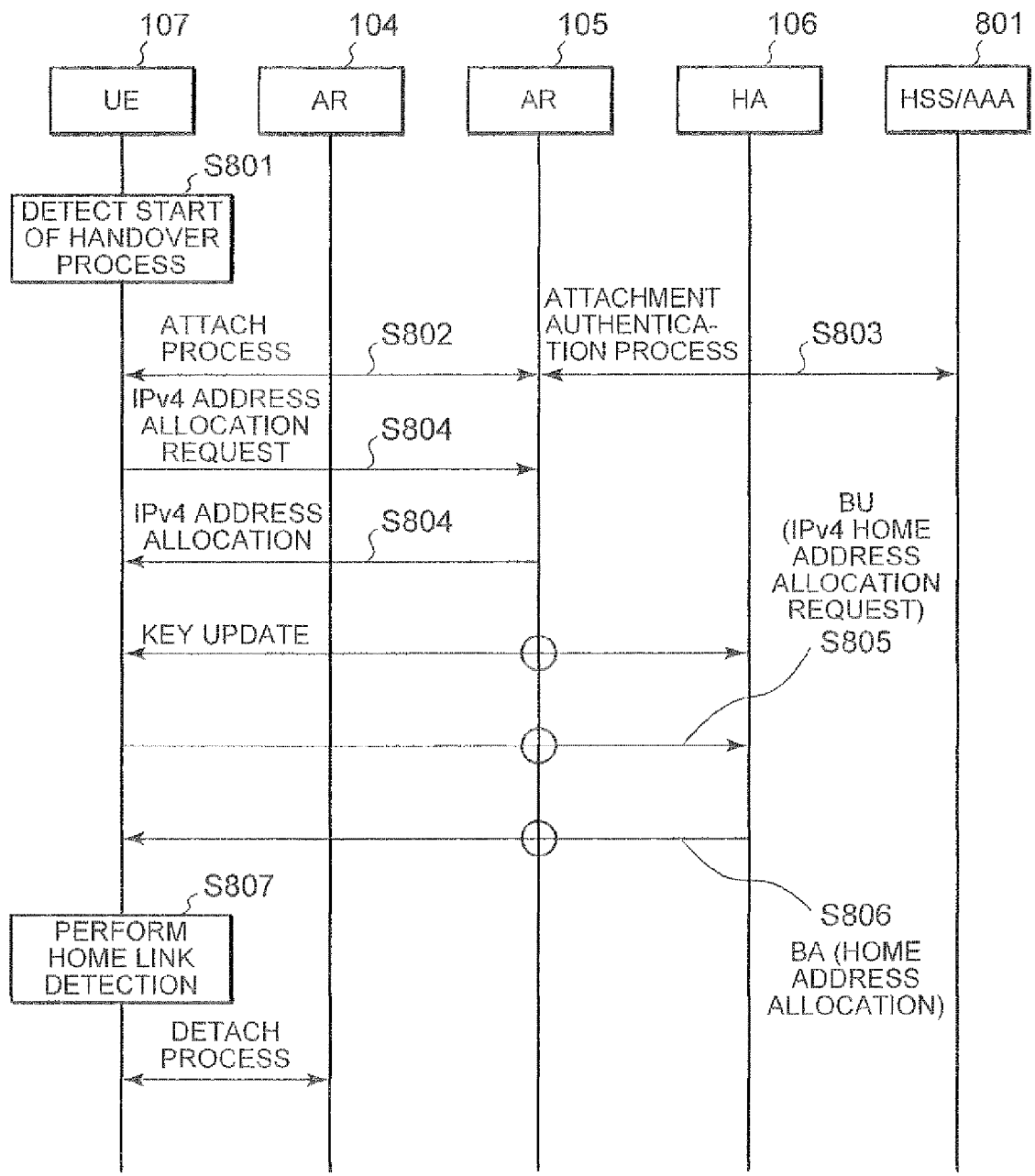
FIG. 8 is a diagram for explaining a prior art.

FIG. 5 is a diagram of an example of a configuration of the HA according to the embodiment of the present invention. A transmitting/receiving unit 501 is equivalent to a communication interface for communicating with a node within the core network 103, and performs a communication protocol process and a modem process of layers below the IP layer. An IP processing unit 502 performs the IP layer process, and an MIP processing unit 503 performs a Mobile IP protocol process based on DSMIP. A PMIP processing unit 504 performs the PMIP protocol process. A home address allocating unit 505 and a translation table managing unit 506 are characteristic of the present invention, and operations thereof will be described with operations of their periphery, with reference to FIG. 7.

The MIP processing unit 503 judges whether a BU from the UE 107 is received via the transmitting/receiving unit 501 and the IP processing unit 502 (Step S701). When the BU is received, the MIP processing unit 503 judges whether notification of the IPv4 home address (and a flag requesting that the IP address provided to the UE 107 in the access network that is the handover target of the UE 107 be the IPv4 home address allocated herein) is present (Step S702). When the notification is present, the MIP processing unit 503 performs any of the following processes (actions 1, 2, or 4).

In other words, when either one of: the translation table managing unit 506 creates a translation table mapping the address included in the BU and the newly allocated home address differing from the address included in the BU (action 1); and the PMIP processing unit 504 provides notification of the address included in the message to the access router of the network of the handover target (action 2), is performed, the translation table managing unit 506 or the PMIP processing unit 504 configures the home address of which notification is provided to the UE 107 by the BA to the address included in the BU.

In addition, when the processing means configures the home address to be allocated in response to the home address allocation request from the UE 107 to another address (second address) differing from the address (IPv4_AN2) included in the BU, and provides notification of the other address to the access router 105 of the network of the handover target, the PMIP processing unit 504 configures the home address of which notification is provided to the UE 107 by the BA to the other address.

The process of the action 1 will be described. At the same time that the IPv4 home address (IPv4_HoA) is newly allocated (Step S703), the translation table managing between the IPv4_HoA and the IPv4 address (IPv4_AN2) of which notification has been provided is created (Step S704) and stored in a storage unit 507. When a packet having the IPv4_AN2 as the transmission source is subsequently received from the UE 107, the translation table is used to rewrite the IPv4_AN2 to IPv4_HoA and forward the packet to the destination node. When a packet having the IPv4_HoA as the destination address is received from the destination node, the translation table is used to rewrite the IPv4_HoA to IPv4_AN2 and forward the packet to the UE 107.

The process for the action 2 will be described. The home address allocating unit 505 controls the PMIP processing 504 to transmit a message indicating (requesting) transmission of a PBU to the AR 105. The PBU request message from the PMIP processing unit 504 is transmitted to the network via the IP processing unit 502 and the transmitting/receiving unit 501 (Step S705). A destination address (AR 105) of the PBU request message may be acquired by issuing an inquiry to a server, such as the authentication server HSS/AAA 801.

Upon reception, when the PMIP processing unit 504 receives the PBU of the AR 105 via the transmitting/receiving unit 501 and the IP processing unit 502, the home address (IPv4_AN2) of which notification is provided to the UE 107 is acquired from the home address allocating unit 505, and is contained in the PBA message and transmitted (Step S706).

The process of the action 4 will be described. The IPv4 home address (IPv4_HoA) is allocated by the BA (Step S707). The home address allocating unit 505 controls the PMIP processing unit 504 to transmit a message indicating (requesting) transmission of the PBU to the AR 105. The PBU request message from the PMIP processing unit 504 is transmitted to the network via the IP processing unit 502 and the transmitting/receiving unit 501 (Step S708). A destination address (AR 105) of the PBU request message may be acquired by issuing an inquiry to a server, such as the authentication server HSS/AAA 801.

Upon reception, when the PMIP processing unit 504 receives the PBU of the AR 105 via the transmitting/receiving unit 501 and the IP processing unit 502, the home address (IPv4_AN2) of which notification is provided to the UE 107 is acquired from the home address allocating unit 505, and is contained in the PBA message and transmitted (Step S709).

In the description above, when the mobile node uses the DHCP request message and the DHCP response message to acquire the IP address is described. Here, the DHCP request message is a message that starts the IP address allocation process, and is equivalent to a DHCP DISCOVER message in DHCP protocol, or when the DHCP server is already known or when transmission of the DHCP DISCOVER message is omitted, is equivalent to a DHCP REQUEST message. In addition, the DHCP response message is a message by which the mobile node is notified of the IP address in the IP allocation process, and is equivalent to a DHCP ACK message or a DHCP OFFER message in DHCP protocol. As a result of receiving the DHCP response message, the mobile node can configure the IP address and related configuring values contained in the message in the interface and start communication.

The HA 106 may judge whether or not to configure the IPv4_AN2 as the home address, based on policies and rules related to QoS and charges acquired from a policy server, such as a policy charging rules function (PCRF), or decided in advance, or based on network environment. For example, the configuring can be permitted only when the UE 107 is subscribing to a plan allowing the home address (home link) to be arbitrarily (or freely) configured, and the present invention can be performed without compromising network functions managed by the operator.

In addition, regarding implementation of the action 1 by the HA 106 when the BU including the HoAv4 allocation request in which the IPv4_AN2 is contained is received via the access network 101, the action 1 may be implemented when whether a predetermined QoS condition (such as a policy or a rule related to the QoS, provided by the PCRF or decided in advance) is compromised is examined in advance by the address translation process in the HA 106, and judgment is made that the QoS is not compromised. When judgment is made that the QoS is compromised, the action 1 is not implemented. As a result, the present invention can be implemented without compromising the optimal or designated QoS, and user-friendliness and operator-friendliness can be increased.

In addition, when the UE 107 acquires only an IPv4 subnet value or cannot even acquire an IPv4 address value (or an IPv4-sub-network value) when attaching to the access network 102 (for example, when notification of an IPv4 address value "0.0.0.0" is provided in response during the attach process and a valid IPv4 address cannot be acquired even in the DHCP procedure), the UE 107 may generate an IPv4 address (may be either a private address or a global address) from the acquired IPv4 subnet or on its own accord, and notify (register in) the HA 106 using a BU message.

At this time, communication between the UE 107 and an external node is performed by the HA 106 translating the IPv4 address generated by the UE 107 on its own according to an IPv4 address (or an IPv6 address) enabling communication with the external node, by implementing the action 1 or the like. In addition, the UE 107 may generate the IPv4 address on its own accord and notify (register in) the HA 106, without receiving an IP address provided from the access network 102. As a result, attachment (handover) time can be reduced.

When the IPv4 address is provided from the access network 102 to the UE 107, a QoS policy (rule) and a charging policy (rule) to be configured are acquired from a policy server, such as the PCRF, (or based on those decided in advance) and applied. Subsequently, the HA 106 that has received the BU message from the UE 107 configures again the same QoS and charging policies applied before. However, because the QoS and charging policies have already been configured during address provision via the access network 102, configuring by the HA 106 during reception of the BU may be omitted. (Conventionally, when the access networks 101 and 102 are of different types, such as 3GPP access and non-3GPP access, a request had been made to reset the QoS and charging policies. However, here, because the IPv4 home address provided by reception of the BU message is clearly used over the access network 102, the content already configured from the access network 102 is not required to be updated. In other words, according to the embodiment of the present invention, configuring by the HA 106 can be omitted.)

In addition, when the HA 106 allocates a dedicated IPv4 home address separate from the IPv4 address of which notification has been provided by the UE 107 (such as when the HA also operates as an NAT), the QoS and charging policies configuring by the HA 106 is performed as in the past. As a result, the QoS and charging policies configuring (application of QoS and charging policies regarding the IPv4 address of which the UE 107 has provided notification in the core network and the access network, and regarding the IPv4 home address allocated by the HA 106 in the interface between the core network and an external network) can be correctly performed for both addresses (the IPv4 address of which notification is received from the UE 107 and the IPv4 home address separately allocated by the Ha 106), and QoS and charging management adhering to an address applicable range can be performed.

In the descriptions above, a handover between a 3GPP access network and a non-3GPP access network in particular is given as an example. However, in a case in which the attach process is not performed, such as a handover between 3GPP access networks, when the access network 102 is a network supporting only IPv4 and the network side (such as PGW or SGW) judges that the UE 107 does not have an IPv4 address during the handover procedure, the UE 107 may be notified of the IPv4 address using a DHCP procedure or the like (a push notification is provided regardless of whether a request from the UE 107 is made) at the end of the handover procedure (in other words, after a wireless bearer is established), or the UE 107 may be notified of the IPv4 address during the handover procedure.

Each functional block used in the descriptions of the embodiments of the present invention, described above, can be actualized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed or a reconfigurable processor of which connections and settings of the circuit cells within the LSI can be reconfigured can be used after LSI manufacturing. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The handover method, and the mobile node and the home agent used in the handover method of present invention configures the handover target access network as a home link, and improves communication efficiency by reducing tunnel overhead between the mobile node and the home agent. In addition, even in a case in which the mobile node performs a key update process, a binding process can be completed before the key update process, and packets can be transmitted and received in the network of the handover target without waiting for the time-consuming key update process to be completed. Therefore, the present invention is useful as a handover method, and a mobile node and a home agent used in the handover method, and the like in a communication system in which communication is performed while moving between networks supporting different IP versions.

The invention claimed is:

1. A handover method for a mobile node that moves between at least two networks each supporting a different, unique IP version that is a communication protocol of the mobile node in which, when the mobile node performs a handover from an access router before the handover to which the mobile node is currently connected, to an access router of another network of a handover destination, when a judgment is made that the IP version supported by the network of the handover destination and the IP version supported by the network before the handover differ based on a first address allocated from the network of the handover destination to the mobile node, the handover method comprising the steps of:

transmitting, by the mobile node, a message including a home address allocation request in the network of the handover destination and the allocated first address, to a home agent via the access router before the handover;

performing, by the home agent, a predetermined process based on the message, and transmitting, by the home agent via the access router before the handover, a response message including a home address in response to the allocation request to the mobile node; and judging, by the mobile node, whether the home address included in the response message is the same as the first address; and deciding, by the mobile node, (i) non-execution of the home link judgment, when the mobile node judges that the home address is the same as the first address and (ii) execution of the home link judgment when the mobile node judges that the home address is not the same as the first address.

2. The handover method according to claim 1, wherein the message includes a flag indicating that the allocated first address be configured as the home address allocated by the home agent.

3. The handover method according to claim 1, wherein:
the home agent, when the predetermined process is to provide notification of the address included in the message to the access router of the network of the handover destination, configures the address included in the message as the home address included in the response message.

4. The handover method according to claim 3, wherein the home agent receives the first address that has already been allocated to the mobile node by the network of the handover destination, from the access router of the network of the handover destination, before providing notification of the address included in the message to the access router of the network of the handover destination, and collates the address included in the message and the received first address.

5. The handover method according to claim 1, wherein the home agent, when the predetermined process is to provide notification of a second address differing from the address included in the message to the access router of the network of the handover destination, configures the second address as the home address included in the response message.

6. The handover method according to claim 5, wherein the mobile node, when the home agent configures the second address as the home address included in the response message, acquires an address from the network of the handover destination and uses the acquired address as the home address.

7. The handover method according to claim 5, wherein the home agent receives the first address that has already been allocated to the mobile node by the network of the handover destination from the access router of the network of the handover destination, before providing notification of the second address to the access router of the network of the handover destination, and collates the address included in the message and the received first address.

8. The handover method according to claim 1, wherein the mobile node judges that the IP version supported by the network of the handover destination and the IP version supported by the network before the handover differ based on being unable to receive a response to a predetermined message transmitted when acquiring the first address and/or being unable to detect a predetermined packet when acquiring the first address.

9. The handover method according to claim 1, wherein the home agent transmits the response message, via the network before the handover and the network of the handover destination.

10. A mobile node that performs a handover between at least two networks each supporting a different, unique IP version that is a communication protocol of the mobile node in which, when the mobile node performs a handover from an access router before the handover to which the mobile node is currently connected to an access router of another network of a handover destination, the mobile node comprising:
   a judging means for judging whether the IP version supported by the network of the handover destination and the IP version supported by the network before the handover differ based on a first address allocated to the mobile node by the network of the handover destination;
   a message generating means for generating a message including a home address allocation request in the network of the handover destination and the allocated first address, when judged that the IP versions differ;
   a transmitting means for transmitting the generated message to a home agent via the access router before the handover;
   a receiving means for receiving via the access router before the handover a response message including a home address in response to the allocation request, transmitted from the home agent based on the message; and
   a judging means for judging whether the home address included in the response message is the same as the first address and for deciding (i) non-execution of the home link judgment when the home address is the same as the first address and (ii) execution of the home link judgment when the home address is not the same as the first address.

11. The mobile node according to claim 10, wherein the message generating means includes a flag indicating that the allocated first address be configured as the home address allocated by the home agent.

12. The mobile node according to claim 10, wherein:
   when the home agent performs a process for providing notification of the address included in the message to the access router of the network of the handover destination, or the home address included in the response message is a second address differing from the address included in the message,
   the message generating means generates an allocation request message for acquiring an address from the network of the handover destination, and
   the transmitting means transmits the generated allocation request message to the access router of the network of the handover destination.

13. The mobile node according to claim 10, wherein the judging means judges whether the IP version supported by the network of the handover destination and the IP version supported by the network before the handover differ based on being unable to receive a response to a predetermined message transmitted when acquiring the first address and/or being unable to detect a predetermined packet when acquiring the first address.

14. A home agent of a mobile node that performs a handover between at least two networks each supporting a different, unique IP version that is a communication protocol of the mobile node in which, when the mobile node performs a handover from an access router before the handover to which the mobile node is currently connected, to an access router of another network of a handover destination, when a judgment is made that the IP version supported by the network of the handover destination and the IP version supported by the network before the handover differ based on a first address allocated from the network of the handover destination to the mobile node, the home agent comprising:
   a receiving means for receiving a message that is a message transmitted from the mobile node, and that includes a home address allocation request in the network of the handover destination and the allocated first address;
   a processing means for performing a predetermined process based on the received message;
   a message generating means for generating a response message including a home address in response to the allocation request; and
   a transmitting means for transmitting via the access router before the handover the generated response message to the mobile node to judge whether the home address is the same as the first address when the mobile node decides that (i) a home link judgment is not necessary when the home address is the same as the first address and (ii) a home link judgment is necessary when the home address is not the same as the first address.

15. The home agent according to claim 14, wherein the message further includes a flag indicating that the allocated address be configured as the home address allocated by the home agent.

16. The home agent according to claim 14, wherein the message generating means, when the processing means provides notification of the address included in the message to the access router of the network of the handover destination as the predetermined process, configures the address included in the message as the home address included in the response message.

17. The home agent according to claim 16 wherein:
   the receiving means receives the first address that has already been allocated to the mobile node by the network of the handover destination from the access router of the network of the handover destination, before the transmitting means provides notification of the address included in the message to the access router of the network of the handover destination; and
   the processing means collates the address included in the message and the received first address.

18. The home agent according to claim 14, wherein the message generating means, when the processing means configures a second address differing from the address included in the message as a home address in response to the allocation request and provides notification of the second address to the access router of the network of the handover destination as the predetermined process, configures the second address as the home address included in the response message.

19. The home agent according to claim 18, wherein the receiving means receives the first address that has already been allocated to the mobile node by the access router of the network of the handover destination from the access router of the network of the handover destination, before the transmitting means provides notification of the second address to the access router of the network of the handover destination; and the processing means collates the address included in the message and the received first address.

20. The home agent according to claim 14, wherein the transmitting means transmits the response message, via the network before the handover and the network of the handover destination.

* * * * *